Feb. 29, 1944.  S. H. BROOKS  2,342,625
BRACKET
Filed Aug. 22, 1942

INVENTOR.
Stephen H. Brooks
BY
Lyman E. Dodge
ATTORNEY

Patented Feb. 29, 1944

2,342,625

UNITED STATES PATENT OFFICE 2,342,625

BRACKET

Stephen H. Brooks, New York, N. Y., assignor to Brooks Equipment Corporation, New York, N. Y., a corporation of New York Application August 22, 1942, Serial No. 455,705

3 Claims. (Cl. 74—380)

This invention relates to machine elements, particularly coupling elements, more especially flexible shaft couplings, and specifically to a bracket therefor.

The principal object of this invention is the production of a device of the type specified which is so constructed that it embodies a bracket or hanger for supporting a flexible coupling in such a manner that the coupling as a whole, together with the driving and driven shafts attached thereto, may move bodily about a pivot.

A further object of the invention is the production of a device of the type specified which is so constructed that a movement about a pivot point, as specified, may take place, but which, in addition, provides means for fixing the position to which a flexible coupling and its associated shafts may have adjusted themselves after being connected to the driving parts and the parts to be driven.

Further objects and advantages will appear as the description of the invention and the particular physical embodiment selected to illustrate the invention progresses, and the novel features will be particularly pointed out in the appended claims.

Figure 1:
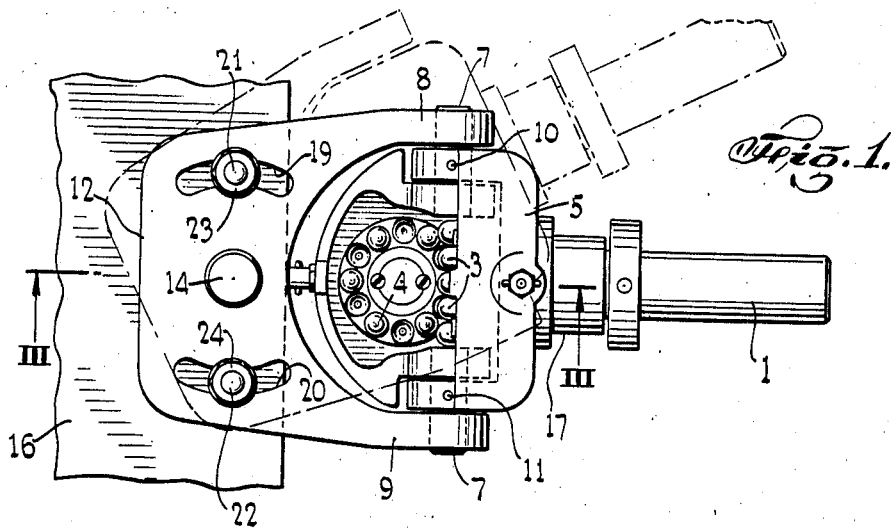
Figures 2, 3:
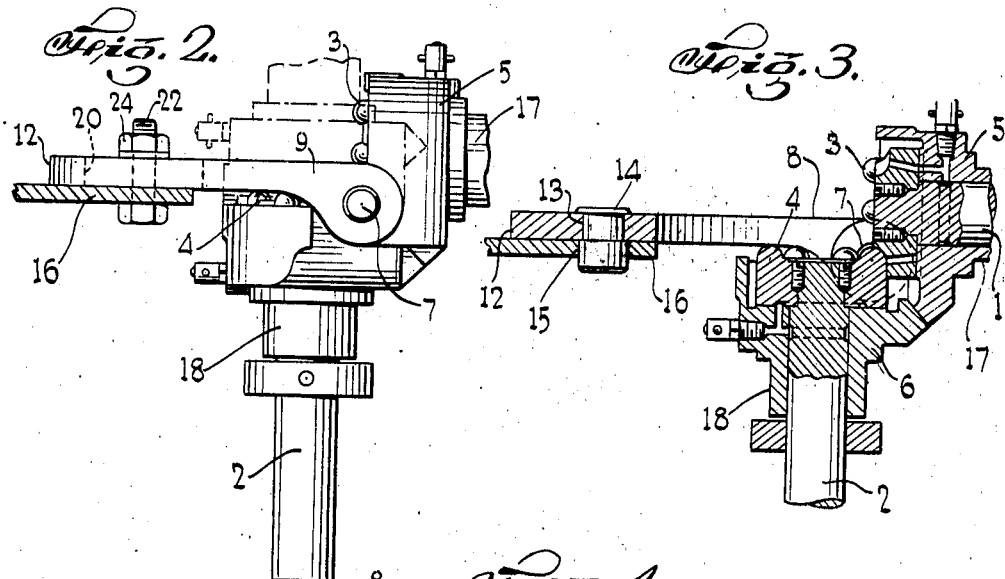
Figure 4:
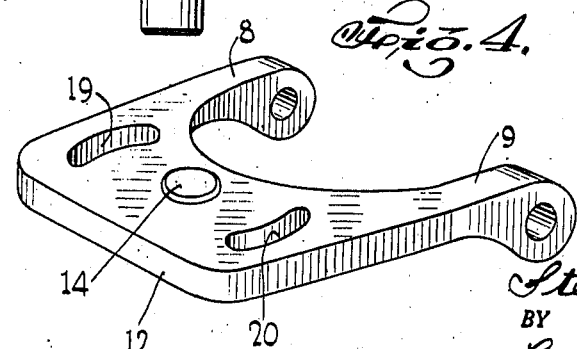

In describing the invention in detail, and the particular physical embodiment selected to illustrate the invention, reference will be had to the accompanying drawing and the several views thereon, in which like characters of reference designate like parts throughout the several views, and in which Figure 1 is a view of a flexible coupling of known form supported by a bracket of the invention; Fig. 2 is a fragmentary side elevational view of the device as shown by Fig. 1; Fig. 3 is a cross-sectional view of the device as shown by Fig. 1 on the plane indicated by the line III—III of Fig. 1, viewed in the direction of the arrows at the ends of the line; Fig. 4 is a perspective view of the bracket of my invention.

In the drawing, the views illustrate a flexible coupling of known form. It is of the form as shown by the Erdman Patent No. 2,261,901, dated November 4, 1941. This flexible coupling includes a shaft 1, which may be considered as the driving shaft, and a shaft 2, which may be considered as the driven shaft. These shafts each have attached to their ends interengaging ball gears 3 and 4 respectively.

Each shaft is journaled in a housing, as 5 and 6, respectively. The housings are relatively pivoted on a pivot pin 7. In the normal construction of the known flexible coupling shown, the pivot pin 7 is made only just long enough to extend to the outer edge of the outer housing 5 but in my invention the pivot pin 7 is extended and is journaled for rotation in bracket arms as 8 and 9. In assembling the device, after the pivot pin 7 has been put through the bracket arms 8 and 9 and the housings 5 and 6, pins 10 and 11 are put through the ears of housing 5 and the pivot pin 7 so as to retain all the parts in proper assembled position, as shown in Fig. 1.

The bracket arms 8 and 9 are united, preferably integrally, with the common member 12 so that the common member 12 through the bracket arms 8 and 9 may serve to support the pivot pin 7 and the associated parts.

The common member 12 is orificed, as at 13, to receive a pivot pin 14. This pivot pin 14 may be supported in any usual or ordinary manner as by being passed through an orifice, as 15 in a fixed support 16.

The fixed support 16 may be any structural member conveniently situated adjacent flexible coupling housings 5 and 6 and may be either perpendicular, horizontal, or at any angle to the perpendicular.

Heretofore flexible joints of the general type of that illustrated herein have been supported by a bracket embracing and grasping the cylindrical surface, such as 17 or 18, and as a consequence, any tendency for bodily movement of the housings 5 and 6 was completely resisted so that, if, due to various causes, the shafts 1 and 2 for proper alignment in the same plane tended to move the housings 5 and 6 bodily, there was no opportunity for such bodily movement to occur, and as a consequence, undesired and perhaps severe stresses were placed upon the assemblage.

By my invention, whereby the assembled housings are pivotally supported by the bracket arms 8 and 9 and the bracket arms 8 and 9 through the common member 12 may revolve about a common pivot 14, if remote ends of the shafts 1 and 2 and their connected shafts are not correctly aligned or if after being correctly aligned, there is a movement of those remote ends such that they are not still in a common plane passing through the longitudinal axes of both shafts, automatic adjustment is possible, in that, the brackets 8 and 9 may move about the pivot 14 to allow both shafts to come into the common plane through their longitudinal axes. By such construction frictional losses, which may be very high, in this type of device is reduced very considerably and thereby the efficiency of power transmission is greatly promoted.

In many cases it may be desired to allow the common member 12 with the bracket arms 8 and 9 to automatically pivot at all times, that is, float. In other cases after the housings 5 and 6 of the associated shafts 1 and 2 have automatically adjusted themselves to the particular situation in which they have been erected, it may be desirable to prevent further floating of the bracket arms 8 and 9. To this end, I have provided means for preventing further pivotal movement of the bracket arms 8 and 9 after they have adjusted themselves to the desired position. Various means may be used for accomplishing this result, but I prefer to form arcuate slots, as 19 and 20, in the common member 12 and pass through these slots and the supporting member, as 16, fastening devices, such as bolts, as 21 and 22. These bolts are preferably threaded to receive nuts, as 23 and 24. After the common member 12 has assumed the pivoted position necessitated by the particular alignment of shafts 1 and 2, the nuts 23 and 24 may be tightened and the bracket arms 8 and 9 fixed rigidly in the proper position.

The foregoing description, taken in connection with the drawing, will serve to teach that the bracket of my invention in no wise interferes with the proper and customary automatic adjustments and movements of the shafts 1 and 2, that is, these shafts may, as usual be moved through a very considerable angle in the plane at a right angle to the longitudinal axis of the pivot pin 7. This movement is usual, but in addition, my invention allows an additional movement of the housings 5 and 6 and the associated parts as a whole without interfering with the usual movement of the coupling, and, at the same time, efficiently supports the flexible joint at the desired location.

Though I have particularly described one physical embodiment of my invention and explained the operation, construction, and principle thereof, nevertheless, I desire to have it understood that the form selected is merely illustrative but does not exhaust the possible physical embodiments of the idea and means underlying my invention.

What I claim as new and desire to secure by Letters Patent of the United States, is:

1. A bracket for supporting a flexible joint of the type including two shafts, a driver and a driven, each pivotable about the longitudinal axis of a pivot pin, including in combination; two arms each provided with a support for receiving and rotatably mounting the said pivot pin; a member common to both arms rigidly connecting the arms together, said member provided with a through orifice adapted to receive a pivot pin whereby the flexible joint is supported when the last mentioned pivot pin is supported by a fixed object and whereby the flexible joint may move as a whole about the center of the last mentioned pivot pin and means for rendering the arms immovable after they have automatically assumed a position about the pivot pin governed by the then disposition of the shafts of the flexible joint.

2. A bracket for supporting a flexible joint of the type including two shafts, a driver and a driven, each pivotable and rotatably mounting the said pivot pin; a member common to both arms rigidly connecting the arms together, said member provided with a through orifice adapted to receive a pivot pin whereby the flexible joint is supported when the last mentioned pivot pin is supported by a fixed object and whereby the flexible joint may move as a whole about the center of the last mentioned pivot pin, said member being formed with arcuate slots each adapted to receive bolts attached to a fixed object whereby the tightening of the bolts will prevent oscillation of the arms about the pivot pin passing through the said member.

3. A bracket including a member having two separate arms each provided with through pivot pin receiving bores, said bracket being further provided with a pivot pin orifice and with an arcuate through slot whereby pivot pins may be rotatably supported in the arms and the arms may be supported on a pivot pin so as to be rotatable thereabout and further rotation may be prevented by bolts attached to a fixed object passed through the arcuate slot.

STEPHEN H. BROOKS.